United States Patent [19]

Wessling

[11] Patent Number: 4,582,863

[45] Date of Patent: Apr. 15, 1986

[54] POLYMER CONCENTRATE CONTAINING AN ANTISTATIC AGENT, PROCESS FOR THE PRODUCTION THEREOF AND THE USE THEREOF

[75] Inventor: Bernhard Wessling, Bargteheide, Fed. Rep. of Germany

[73] Assignee: Zipperling Kessler & Co. (GmbH & Co.), Ahrensburg, Fed. Rep. of Germany

[21] Appl. No.: 686,407

[22] Filed: Dec. 26, 1984

[30] Foreign Application Priority Data

Dec. 31, 1983 [DE] Fed. Rep. of Germany ....... 3347704

[51] Int. Cl.$^4$ .......................... C08K 9/00; C08K 5/42; C08J 3/22; G11B 7/26
[52] U.S. Cl. .................................. 523/206; 523/174; 524/911; 428/407
[58] Field of Search ................. 523/174, 206; 428/407; 524/911

[56] References Cited

U.S. PATENT DOCUMENTS

| | | |
|---|---|---|
| 2,978,440 | 4/1961 | Frissell et al. . |
| 3,404,124 | 10/1968 | Scott et al. . |
| 3,644,310 | 2/1972 | Hopkins ............................... 524/911 |
| 3,723,153 | 3/1973 | Nagata et al. . |
| 4,040,996 | 8/1977 | Vonno ................................. 428/407 |
| 4,246,168 | 1/1981 | Sorenson ............................. 428/407 |
| 4,276,138 | 6/1981 | Asai et al. ........................... 528/487 |
| 4,285,994 | 8/1981 | Pearce et al. ....................... 428/407 |
| 4,298,654 | 11/1981 | McCarty et al. ................... 428/407 |
| 4,375,497 | 3/1983 | Sandstrom ......................... 523/206 |

FOREIGN PATENT DOCUMENTS

| | | |
|---|---|---|
| 1160251 | 10/1984 | Canada . |
| 1215925 | 5/1966 | Fed. Rep. of Germany . |
| 2341950 | 3/1974 | Fed. Rep. of Germany . |
| 2454816 | 7/1975 | Fed. Rep. of Germany . |
| 1544670 | 2/1979 | Fed. Rep. of Germany . |
| 2826360 | 12/1979 | Fed. Rep. of Germany . |
| 1345827 | 12/1962 | France . |
| 0008104 | 1/1982 | Japan ................................. 428/407 |
| 849039 | 9/1960 | United Kingdom . |

OTHER PUBLICATIONS

Derwent Abstract 84-181733/29, Kronman S. U., 1054372 (Nov. 1983).
Derwent Abstract 84-167941/27, Sun Arrow Kagaku KK, May 1984.

*Primary Examiner*—Herbert J. Lilling
*Attorney, Agent, or Firm*—Cushman, Darby & Cushman

[57] ABSTRACT

A polymer concentrate containing an antistatic agent and a process for the production thereof are provided, in which the antistatic agent is applied to the particle surface of a finely divided polymer powder. The thus obtained concentrate is suitable for producing plastic molding compounds for plastic finished products, such as phonograph records having improved characteristics.

9 Claims, No Drawings

POLYMER CONCENTRATE CONTAINING AN ANTISTATIC AGENT, PROCESS FOR THE PRODUCTION THEREOF AND THE USE THEREOF

FIELD OF THE INVENTION

The present invention relates to an anti-static polymer composition and to a process for producing a first concentrate or master batch for use in formulation of a moulding compound from which anti-static moulded plastic objects can be manufactured.

BACKGROUND OF THE INVENTION

Most commercially available synthetic polymers have electrical insulating characteristics, i.e. they are dielectric materials. As a result, finished products made from such polymers, such as phonograph records or disks, often develop strong static electrical charges when subjected to mechanical friction, whereby dust and dirt particles are attracted thereto and held thereon.

It has already been a past practice subsequently to finish synthetic fibers with various antistatic substances in order to combat the aforementioned phenomena. Various surfactants, including anionic, cationic, and nonionic known organic surfactants have been used as such antistatic substances.

It has further often been proposed to mix plastic molding compositions with antistatic substances with the objective of obtaining plastic products with permanent, built-in, antistatic properties. See, for instance, DE-AS 1 215 925, DE-OS 15 44 670, DE-AS 23 41 950, and U.S. Pat. No. 2,978,440. However, antistatic agents have only a limited compatibility with conventionally used organic polymer plastics, such as polyvinyl chloride (PVC). As a result the added antistatic agents at least partially migrate to the surface of the ultimately-formed object, which is accompanied by the formation of a thin surface film. Plastic products produced from such plastic materials, as by compression molding, then have a reduced tendency to acquire an electrostatic charge because water from air is sorbed onto this surface film and together with the antistatic agent is able to dissipate the static charge.

However, the quality of an antistatic finish in other respects is particularly critical in the case of various molded objects, and especially so in the case of phonograph records made from PVC-vinyl acetate (VA) copolymers. Attempts have already been made to produce in this manner antistatically-finished phonograph records. See, for instance, Soviet Pat. No. 870,416 (C.A., vol. 96, 105239v), Soviet Pat. No. 891,715 (C.A., vol. 96, 182280d), and EP-PS 10975. However, these various past attempts have failed under practical conditions, probably mainly due to the fact that the surface film of antistatic substances has an irregular thickness and tends to be formed in a droplet-like manner rather than as a smooth contiguous surface film. As a result, phonograph records produced in this fashion exhibit an increased background noise level during playback which is unacceptable under present day standards for phonographic recordings. In addition, the irregular thickness of the surface film does not provide uniform charge dissipation and when molding such materials, there tends to be a surface depletion of the antistatic agent. Surface resistance values of $10^{11}$ to $10^{12}\Omega$ have been measured. This means that the discharge half-life of the electrostatic charges is in the range of minutes so that there is no question of having achieved an effective antistatic finish on the molded product.

Through the use of special compounding processes, providing a particularly complete homogeneous distribution of the necessary high antistatic agent quantities, it is possible to obtain a granular material from which it is possible to compression mold phonograph records having a surface resistance in the range of $10^8$ to $10^9\Omega$ and a discharge half-life of below 1 second. However, the disadvantage of this procedure is that all of the molding composition components must pass through this complicated compounding stage and, in general, the phonograph record manufacturer does not generally have such equipment.

SUMMARY AND OBJECTS OF THE INVENTION

The present invention provides a polymer concentrate containing an anti-static agent. The polymer concentrate comprises a vinyl chloride homopolymer or copolymer, or an acrylonitrile/butadiene/styrene copolymer, in the form of a free-flowing finely-divided powder which exhibits no tendency to cake. The polymer powder particle surfaces are uniformly wetted or coated with the anti-static agent.

The present invention also provides a process for producing a first concentrate or master batch for use in formulation of a moulding compound from which anti-static moulded plastic objects can be manufactured. This process broadly comprises providing a finely-divided powder composition of a suitable thermoplastic synthetic polymer, coating the polymer particles with from about 2 to about 20 weight % of an anti-static agent by thoroughly mixing the anti-static agent with the powdered polymer particles whereby a powdered concentrate is obtained. The powdered concentrate is composed of thermoplastic polymer powdered particles substantially uniformly coated with the anti-static agent.

Therefore, it is an object of the present invention to provide an improvement in the production of molded plastic products, in particular phonograph records or disks, having surface resistance values of approximately $10^8$ to $10^9\Omega$ and having a static charge discharge half-life of at most a few seconds, preferably less than one second.

Another object of the present invention is to provide a first concentrate or master batch composed of an anti-static agent which is blended with a finely-divided particulate polymer powder such that the individual powdered particles are coated with the anti-static agent.

DETAILED DESCRIPTION OF THE INVENTION

According to the present invention, a first concentrate or master batch containing the antistatic agent is added to and incorporated into the basic polymer composition (lacking antistatic properties) in such manner that the finished product can now be manufactured without the aforementioned compounding problems. These requirements are not fulfilled by hitherto-known polymer concentrates containing antistatic agents. See, for instance, DS-OS 24 54 816, French Pat. No. 1,354,816.

One object of the present invention is therefore to provide a first concentrate or master batch of an antistatic agent blended with a finely divided particulate polymer powder so that the surfaces of the individual particles of the polymer become coated with the antistatic agent. In the practice of the invention, the surfaces of the finely divided polymer powder particles are substantially uniformly enveloped with and by the antistatic agent.

The resulting first concentrate should also have the charactersistics of being substantially free flowing, so that flows thereof can be quantitatively metered, for incorporating the same into the remaining plastic components required for the plastic molding compound or main batch, from which the ultimate article is to be fabricated.

Incorporation of the first concentrate or master batch into the plastic moulding compound may now be achieved using conventional pre-mixing processes, for instance with heating/cooling mixers, and without additional effort or expenditure for equipment, because the basic plastic molding compounds are presently thus generally formulated with added stabilizers and lubricants to form a processable or granulatable free-flowing dry mixture, i.e. to form a so-called dry blend.

Large numbers of record blanks can now be readily produced using this powder mixture which does not itself have to be further granulated and which has a completely satisfactory quality—both as to molding characteristics and as to final product quality. The thus-produced records in particular have a decreased, rather than an increased, background noise level, and the surface resistance values are within the desired range so that there is a substantially immediate discharge of any electrostatic charges. Thus, such plastic products have little attraction for dust and dirt particles even when left or used for a long period, which insures long-term better acoustic reproduction quality from the phonograph record.

The process according to this invention is preferably performed in such a manner that the antistatic agent, either in the form of a dispersion or a solution, is mixed with the first polymer powder, and then the dispersant or solvent is removed to provide the concentrate or first master batch. A particularly suitable dispersant or solvent is water, but alternatively alkyl $C_2$ to $C_4$ alcohols are also suitable. After producing the dispersion or paste, the solvent or dispersant must be substantially completely removed, which can be carried out by conventional means. Suitable conventional means include such as, by example, distillation, either at atmospheric or reduced pressure. When water is used, the finished concentrate should contain less than 0.1% by weight of water, so that the resultant dry powder of the first master batch will be free-flowing, free from bubbles, and suitable for quantitative metering thereof into the main batch. If antistatic agents having a low melting point are used, it is also possible to treat the polymer powder with a melt of the antistatic agent and in this way obtain a pulverulent concentrate in which the individual particles are largely homogeneously and smoothly enveloped by the antistatic agent. The thus-obtained concentrates are characterized by a glass marble-structure surrounding an enclosed polymer powder core.

The antistatic agents which may be used in the practice of this invention may be any of the widely varied chemical substances already known for this purpose. Preference is given to the use of surfactants, for instance from the list given by S. Riethmayer, GAK, 1973, page 510, the disclosure of which is incorporated herein by reference. Particular preference is given to alkyl sulphonates having from 10 to 20, preferably from 16 to 20, carbon atoms in the alkyl radical, and which are particularly used in the form of their alkalimetal salts.

The antistatic agent is added to the first polymer powder in a quantity of approximately 2 to 20, preferably 3 to 15% by weight, based upon the polymer powder. An antistatic agent content in the first concentrate or of approximately 5 to 10% by weight, based on the polymer powder, is particularly advantageous.

For the production of the plastic molding compound, the aforesaid first concentrate batch is incorporated in such a quantity into the main batch that the ultimate molding compound itself contains approximately 0.3 to 1.0 and preferably from 0.5 to 0.8% by weight of the antistatic agent, in each case based upon the total weight of the molding compound.

The plastic powder used for making the concentrate preferably consists of homopolymers or copolymers of vinyl chloride, but other polymers, in powder form, may also be employed, for instance acrylonitrile-/butadiene/styrene copolymers. When the end product is formed of more than one polymer component, it is advantageous to use as the polymer powder the high molecular weight portion of the polymer mixture employed, and thus to have this powder be given the antistatic finish. For instance, a powder of a high molecular weight polyvinyl chloride can be employed for the formation of the first concentrate, and this powder can then be processed with a "partially" compatible PVC powder of low to medium molecular weight in order to obtain the final plastic molding compound mixture.

When producing the antistatic agent-containing master batch, it is also advantageous to add thereto all of the other conventionally employed additives, such as stabilizers, lubricants, coloring agents (pigments, dyes), fillers, and other processing aids required for the final polymer mixture to be processed to the finished articles, and to incorporate the same as well into the antistatic envelope or coating on the powdered plastic material. The plastic powder so used should be porous and advantageously has a particle size of less than 500, particularly from about 50 to 400 microns.

At present, it is not possible to fully to explain what has led to the surprising success of the process according to this invention. On the basis of existing findings, it can be assumed that the individual polymer powder particles are enveloped by the antistatic agent which is held by sufficiently strong and firm chemisorption and-/or physisorption bonds so as to lead to an extremely uniform distribution of the antistatic agent, and consequently to a marked improvement in the dispersibility of the antistatic agents (and of the other additives) during the final mixing and blending stage, without causing any excessive or non-uniform exudation.

Concentrates containing an antistatic agent according to this invention when thus incorporated into the master batch are thus suitable for use in producing anti-statically finished plastic molding compounds. It is possible to produce therefrom widely varired finished plastic products including blown or calendered sheets or films, hollow bodies such as bottles, pipes, plates (which also can be used in further processing in thermoforming techniques) and various injection molded articles. These concentrates provided by this invention have proved to be particularly suitable for producing plastic molding compounds for the production of phonographic records.

The following examples will serve further to illustrate the invention which is, however, not limited to the specific embodiments shown therein.

EXAMPLE 1

A first concentrate according to this invention was prepared as follows. In a high-speed mixer (Henschel FM 150) with a heating/cooling mixer combination, at high speed 100 parts of a PVC powder (made by suspension polymerization) with a K value of 70, an MFI (200/21.6) of 1.0, a bulk density of 460 g/cm$^3$, a chlorine content of 56% and a particle size distribution maximum of about 100 microns, were brought to a mixing temperature of 140° C. with 5 parts of a tin stabilizer, 3 parts of a paraffin wax and 3 parts of calcium stearate. The mixer was then switched over to slow speed and 12 parts of an alkyl sulphonate melt preheated to 180° to 200° C. were introduced through an opening into the mixing chamber within three minutes and with the aid of a screw feeder.

After mixing for about 9 minutes, this first concentrate mixture was cooled and then, in another high-speed mixer, 7 parts of this concentrate were admixed at 85° C. with 100 parts of a PVC-VA copolymer with a K value of 60, an MFI (185/10) of 9.0 and a vinyl acetate (VA) content of 9% by weight. This formed a final plastic molding composition.

EXAMPLE 2

The dry blend thus obtained can now be granulated or may advantageously be pressed directly into phonograph records on a conventional commercial extruder press combination. The phonograph records thus obtained have, at 60% relative atmospheric humidify, a surface resistance of approximately $5 \times 10^8 \Omega$, a discharge half-life of less than 1 second and a background noise level of only $-67$ dB (non-antistatic records: $-64$ dB). The stamping equipment was free from any film deposits.

EXAMPLE 3

In the same way, it is possible to mix an ABS powder (MFI 200/5:1.2) with the antistatic agent and coloring agents (3 to 10 parts) at a mixing temperature of 125° C. and without processing aids. 10 parts of this concentrate may be added to 100 parts of ABS to form a final plastic molding compound.

EXAMPLE 4

A solution of 12 parts of alkane sulphonate in 40 parts of H$_2$O at 80° C. was rapidly added at high speed to the PVC powder of Example 1. The material thus obtained was fed onto a conveyor belt for 60 seconds in the form of a thin coating and passed through a drying oven heated to 102° C. Drying took place by dry air fed in counterflow and optionally additional heating means in the drying channel.

For a flow rate of 200 kg/h, it is adequate to have a 500 mm wide belt, a drying zone of 10 m and a belt speed of 0.85 m/h, for a layer thickness of 10 mm. There was thus obtained a first concentrate composed of dry antistatic agent coated PVC polymer powder.

EXAMPLE 5

Alternatively, the first concentrate mixture ejected from the high-speed mixer of Example 4 can be fed into a vertically arranged remixer whose conventionally-cooled water supplied double walls are now heated with superheated steam at 120° C. By means of a pipe, hot (90° C.) dry air (dew point $-30°$ C.) is introduced into the circulated material. The water-enriched air passes out through an additional opening on the mixer top and is circulated by means of a commercially available drying means.

The first concentrate dry powders obtained according to Examples 4 and 5 can be further processed according to the second paragraph of Example 1 and Example 2.

I claim:

1. A process for producing anti-static moulded plastic objects containing from 0.3 to 1% by weight of an anti-static agent which process comprises:
   (a) providing a finely-divided powder composition of a thermoplastic synthetic polymer comprising a vinyl chloride homopolymer or copolymer, or an acrylonitrile/butadiene/styrene copolymer,
   (b) coating said powder composition with from 2 to 20% by weight of an alkyl sulfonate anti-static agent by thoroughly mixing the same in liquid form with said powder particles, whereby a powdered first concentrate is thus obtained, said powdered concentrate is composed of thermoplastic polymer powdered particles substantially uniformly coated with said anti-static agent,
   (c) formulating said concentrate into a moulding composition by addition of further amounts of a thermoplastic polymer comprising a vinyl chloride homopolymer or copolymer, or an acrylonitrile/butadiene/styrene copolymer, and
   (d) manufacturing anti-static moulded plastic objects from the thus obtained moulding composition, whereby the thus molded plastic objects have surface resistance values of about $10^8 \Omega$ to $10^9 \Omega$.

2. A process according to claim 1, wherein said alkyl sulfonate anti-static agent is mixed with said powder in the form of a dispersion or solution thereof, following which the solvent or dispersant is removed to provide a substantially dry first concentrate.

3. A process according to claim 2 wherein the dispersant for the dispersion is water, an alkyl C$_2$ to C$_4$ alcohol, or a mixture thereof.

4. A process according to claim 2 wherein the solvent for the solution is water, an alkyl C$_2$ to C$_4$ alcohol, or a mixture thereof.

5. A process according to claim 1, wherein a melt of said alkyl sulfonate anti-static agent is first prepared and thereafter said melt then mixed with the said powder of step (a).

6. A process according to claim 1, wherein further conventional additives are admixed with said powder along with said anti-static agent in step (b).

7. A process according to claim 1, wherein said powder has an average particle size range of from about 50 to 400 microns.

8. A process according to claim 1, wherein said powdered concentrate is made from the high molecular weight proportion of the thermoplastic synthetic polymer, and that said concentrate is formulated into a moulding composition by adding thereto further amounts of a thermoplastic polymer having a lower molecular weight.

9. A process for producing anti-static moulded plastic objects comprising:
   providing a finely-divided powdered composition composed of a thermoplastic synthetic polymer, said thermoplastic synthetic polymer comprising a vinyl chloride homopolymer, a vinyl chloride copolymer, or an acrylonitrile/butadiene/styrene copolymer;

coating said powdered composition with from 3 to 15% by weight of an alkyl sulfonate anti-static agent wherein said alkyl sulfonate is employed in the form of a dispersion, solution or melt whereby a powdered first concentrate is thus obtained, said powdered concentrate is composed of powdered particles of a thermoplastic polymer which are substantially uniformly coated with said anti-static agent;

adding additional amounts of a thermoplastic polymer comprising a vinyl chloride homopolymer or copolymer, or an acrylonitrile/butadiene/styrene copolymer whereby said concentrate is thus formulated into a molding composition, said additional thermoplastic polymer having a lower molecular weight than the thermoplastic polymer of said powdered first concentrate; and manufacturing anti-static molded plastic objects from the thus obtained molding composition, whereby the thus molded plastic objects have surface resistance values of about $10^8 \Omega$ to $10^9 \Omega$.

* * * * *